United States Patent
Eicher et al.

(10) Patent No.: US 10,402,746 B2
(45) Date of Patent: Sep. 3, 2019

(54) COMPUTING INSTANCE LAUNCH TIME

(71) Applicant: Amazon Technologies, Inc., Reno, NV (US)

(72) Inventors: Anton André Eicher, Western Cape (ZA); Matthew James Eddey, Seattle, WA (US); Richard Alan Hamman, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 14/482,789

(22) Filed: Sep. 10, 2014

(65) Prior Publication Data

US 2016/0071023 A1  Mar. 10, 2016

(51) Int. Cl.
*G06N 5/02* (2006.01)
*G06N 20/00* (2019.01)

(52) U.S. Cl.
CPC ............ *G06N 20/00* (2019.01); *G06N 5/025* (2013.01)

(58) Field of Classification Search
None
See application file for complete search history.

(56) References Cited

U.S. PATENT DOCUMENTS

| | | | |
|---|---|---|---|
| 6,202,190 B1 | 3/2001 | Rogier | |
| 2009/0271341 A1 | 10/2009 | Wang | |
| 2011/0173474 A1 | 7/2011 | Salsbery et al. | |
| 2012/0131181 A1* | 5/2012 | Birkler | G06F 9/5083 709/224 |
| 2012/0151062 A1* | 6/2012 | Gusev | G06F 9/5011 709/226 |

(Continued)

FOREIGN PATENT DOCUMENTS

| CN | 103034453 A | 4/2013 |
|---|---|---|
| CN | 103748555 | 4/2017 |

(Continued)

OTHER PUBLICATIONS

George Kousiouri S et al., The effects of scheduling, workload type and consolidation scenarios on virtual machine performance and their prediction through optimized art ificial neural networks, Journal of Systems & Software, Elsevier North Holland, Apr. 6, 2011, pp. 1270-1291, vol. 84, No. 8, New York, NY, US.

(Continued)

*Primary Examiner* — Kakali Chaki
*Assistant Examiner* — Michael Zidanic
(74) *Attorney, Agent, or Firm* — Thorpe North & Western, LLP

(57) ABSTRACT

A technology is described for predicting a launch time for a computing instance. An example method may include receiving a request for a predicted launch time to launch a computing instance on a physical host within a computing service environment. Data associated with launch features of a computing instance may then be obtained, where the launch features may be determined to have an impact on a launch time of the computing instance on a physical host within a computing service environment. The launch features of the computing instance may then be input to a machine learning model that outputs the predicted launch time for launching the computing instance within the computing service environment.

19 Claims, 7 Drawing Sheets

(56) References Cited

U.S. PATENT DOCUMENTS

2013/0318527 A1    11/2013  Tamura
2016/0380908 A1*  12/2016  Larsson ................ G06F 9/5072
                                                                709/226

FOREIGN PATENT DOCUMENTS

| JP | 2006-155449 | 6/2006 |
| --- | --- | --- |
| JP | 2010-097369 | 4/2010 |
| JP | 2012-108651 | 6/2012 |
| JP | 2013-041397 | 2/2013 |
| JP | 2013-089025 | 5/2013 |
| JP | 2013-516025 A | 5/2013 |
| WO | WO 2011/085330 | 7/2011 |
| WO | WO 2014/047073 | 3/2014 |

OTHER PUBLICATIONS

Amasaki, Evaluation on Weighted Moving Windows on Model-based Effort Estimation, IPSJ SIG Technical Report, Dec. 15, 2012, pp. 1-8, vol. 2012-SE-178 No. 24, Nov. 2, 2012, Japan.
Hao Wu et al., Modeling the Virtual Machine Launching Overhead under Fermicloud, 2014 14th IEEE/ACM International Symposium on Cluster, Cloud and Grid Computing, May 2014, p. 374-383, Chicago, Illinios.

\* cited by examiner

COMPUTING INSTANCE LAUNCH TIME

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Launching one or more computing instances on a single physical computing machine may entail identifying available computing resources (e.g., a physical host) on which a computing instance may be loaded and executed. A time to load and launch a computing instance on a host server may vary due to various aspects of the computing environment containing a physical host and aspects of the computing instance being launched. As a result, a launch time for a computing instance may range from a few minutes to several minutes.

DETAILED DESCRIPTION

A technology is described for determining a predicted launch time for a computing instance within a computing service. In one example of the technology, in response to a request for a predicted launch time (e.g., a time to launch a computing instance on a physical host within a computing service), launch features associated with launching the computing instance on a physical host may be input into a machine learning model that outputs a predicted launch time. The launch features used as input to the machine learning model may be launch features that have been determined to have an impact on an amount of time in which the computing instance is launched on the physical host. As referred to in this disclosure, a computing instance may be a virtual machine (e.g., an instance of a software implementation of a computer) that executes applications like a physical machine. A computing service may be a network accessible service that provides customers with network accessible computing instances.

The machine learning model used to generate a predicted launch time may be trained using features that represent launch metrics from previous computing instance launches. The features used to train the machine learning model may be features determined to have an impact on the amount of time in which to launch a computing instance. In one example configuration, training of the machine learning model may be performed offline (e.g., in a non-production environment) using features extracted from historical launch metrics (e.g., weekly using the previous week's data). In another example configuration, the machine learning model may be trained while online (e.g., in a production environment) using features extracted from recent launch metrics.

A launch time for a computing instance, in one example, may include executing service calls to setup computing instance resources (e.g., storage and network interfaces), selecting a physical host for the computing instance and creating the computing instance on the physical host. The launch time may vary based on a launch configuration for the computing instance. Therefore, a computing service provider may have difficulty in providing an expectation time frame for when a particular computing instance will be available for use. As a result of this technology, a computing service provider may obtain a predicted launch time that may then be used for a number of purposes. For example, the computing service provider may provide a customer with an estimate of when a computing instance may be available for use, determine whether an SLA (Service Level Agreement) time may be met, suggest launch configurations that may result in a faster launch time, as well as a number of other purposes.

Figure 1:
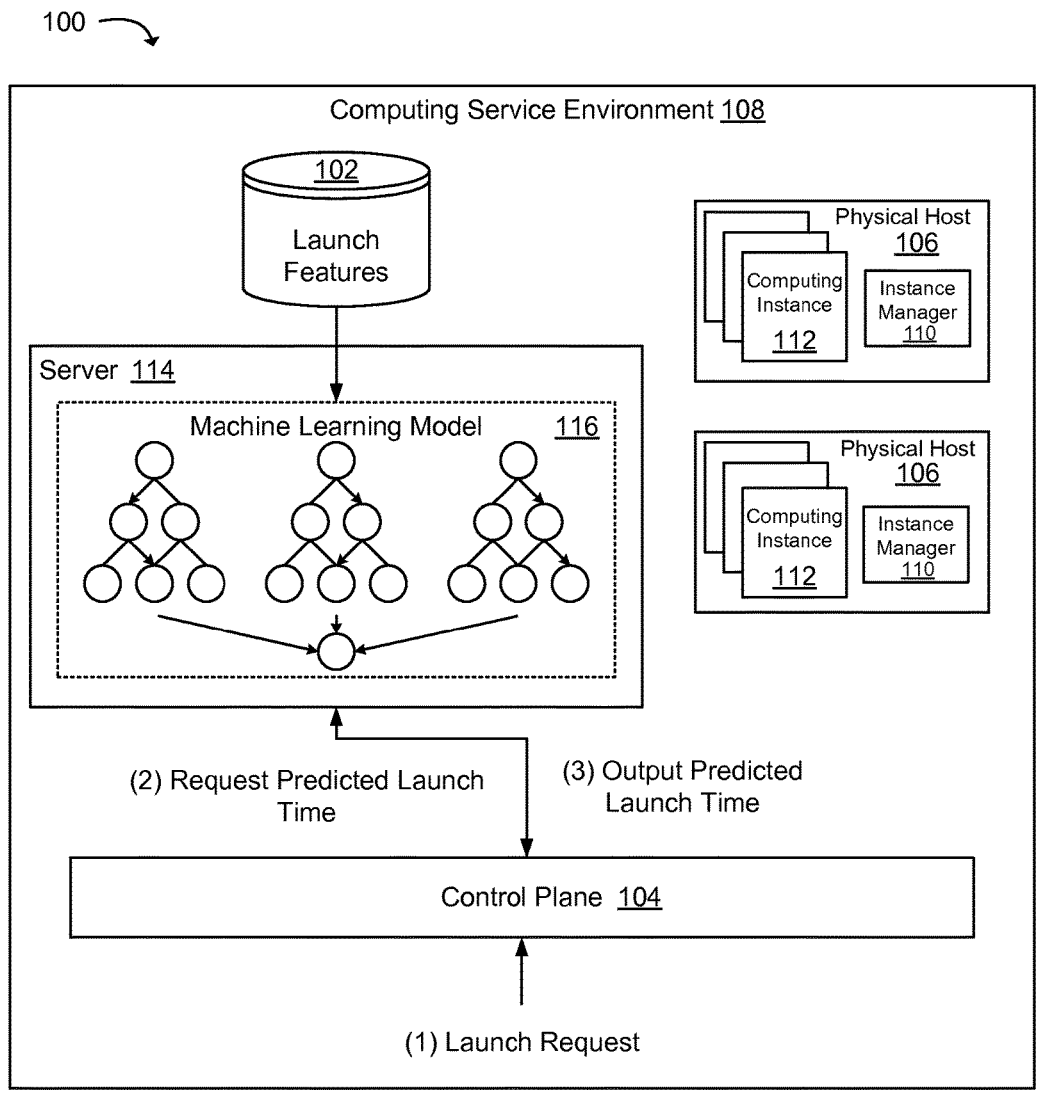
FIG. 1 is a block diagram illustrating an example system for predicting a launch time of a computing instance within a computing service environment.

FIG. 1 is a diagram illustrating a high level example of a system 100 that may be used to predict a launch time for a computing instance 112 within a computing service environment 108. The system 100 may include a number of physical hosts 106 that execute computing instances 112 via an instance manager 110 (e.g., a hypervisor) and a server 114 that executes a machine learning model 116. In one example configuration, the server 114 may be in communication with a number of data sources from which data for launch features 102 may be obtained (e.g., training data and data associated with a launch request). The machine learning model 116 may be trained using historical training data, after which the machine learning model 116 may generate predicted launch times for computing instances 112 by using launch features 102 for a computing instance launch to determine a predicted launch time for the computing instance launch.

As an illustration, a server 114 executing a machine learning model 116 (e.g., a random forest regression model) that has been previously trained may receive a request for a predicted launch time. A predicted launch time may be the time between receiving a launch request (e.g., a computing instance state is "pending") and the start of a computing instance boot (e.g., the computing instance state is "running"). The request for the predicted launch time may reference a launch configuration used to identify launch features 102 associated with a launch request. The launch features 102 identified may be used by the machine learning model 116 to determine a predicted launch time for a computing instance 112. As an illustration, a launch request (1) may be sent to a control plane 104 of a computing service requesting that a computing instance 112 be launched. Upon receiving the launch request, a launch request configuration may be generated that specifies various parameters for launching the computing instance 112. For example, a launch request configuration may specify a computing instance type for the computing instance 112 (e.g., micro, small medium, large, etc. and general purpose, memory intensive, etc.), a machine image for the computing instance 112, a network type to associate with the computing instance 112, a storage volume to attach to the computing instance 112, a physical host 106 selected to host the computing instance 112, as well as other specifications.

The control plane 104 may then make a request (2) to the server 114 hosting the machine learning model 116 for a predicted launch time. Using information included in the launch request configuration, launch features identified as impacting a launch time may be collected and the launch features may then be provided to the machine learning model 116. As an illustration, a launch request configuration may be referenced to obtain information about a computing instance 112 to be launched, accessories to be attached to the computing instance 112 and information about a physical host 106 that will host the computing instance 112. The information from the launch request configuration may then be used to identify launch features, such as a machine image and a kernel image used to create the computing instance 112, an operating system and networking type, a geographic region where the physical host 106 is to be located, a maximum number of computing instances 112 that the physical host 106 is capable of executing, etc. The launch features 102 identified using information from the launch request configuration may then be provided as input to the machine learning model 116, which may then output (3) a predicted launch time for the computing instance 112.

The predicted launch times generated by the machine learning model 116 may be used for any purpose. For example, a predicted launch time may be a factor used in analysis to improve computing instance launch times, a predicted launch time may be used to determine the physical host 106 placement of a computing instance 112, a predicted launch time may be used to determine SLA (Service Level Agreement) launch times provided to customers, or a predicted launch time may be a factor in advising customers of computing instance configurations that result in faster launch times. As an illustration of utilizing a predicted launch time, an SLA launch time (e.g., an agreement between a computing service provider and a customer of a time in which to launch a computing instance 112) may be compared with a predicted launch time for a computing instance 112 to determine whether the SLA launch time is likely to be met. As such, a computing service provider and/or a customer may be notified that an SLA launch time for a computing instance 112 is likely to be breached, which may allow the computing service provider and/or the customer to take action in response to the notification.

Prior to placing the machine learning model 116 in a production environment where the machine learning model 116 receives requests for predicted launch times, the machine learning model may be trained in order to predict launch times for various computing instance launch configurations. In one example configuration, the machine learning model 116 may be trained using features that have been determined to have an impact on a launch time of a computing instance 112 within a computing service environment 108. In making a determination of which features have an impact on a launch time of a computing instance 112, analysis of computing instance launches may be performed to identify features correlated with or associated with launching the computing instance 112. As an illustration, a launch of a computing instance 112 may involve the steps of executing service calls to setup computing instance resources (e.g., storage and networking interfaces) for the computing instance 112, selecting a physical host 106 for the computing instance 112 (e.g., location) and creating the computing instance 112 on the physical host.

Analyzing the steps of the computing instance launch may identify features associated with launching a computing instance 112. For example, features associated with setting up the computing instance resources, features associated with selecting a physical host 106 and features associated with the configuration of the computing instance 112 (e.g., a machine image used to create the computing instance 112). Those features identified may then be sorted or ranked according to an impact that the features have on the launch time. For example, the features may be ranked according to features that have the greatest impact on the launch time, and those features having the greatest impact on the launch time may receive a higher ranking as compared to those features having little impact the launch time. Those features having higher rankings may be selected and used when determining a predicted launch time.

In another example, features determined to have an impact on a launch time of a computing instance 112 may be selected from a number of feature categories. Illustratively, feature categories may include machine image features, physical host features and customer configuration features (e.g., features of a launch configuration that are within a customer's control to modify). Features from these categories may be selected and used in determining a predicted launch time.

Feature data for those features selected as having an impact on the launch time of a computing instance 112 may be retrieved from a respective data source (e.g., active training data or historical training data) and used to train the machine learning model 116. The feature data may be, for example, launch metrics from previous computing instance launches within the computing service 108. The feature data may in some examples be transformed into a reduced representation set of features (e.g., a features vector) when feature data is redundant or large. Further, feature data may be normalized prior to training the machine learning model 116.

In one example configuration, the machine learning model 116 may be trained offline (e.g., prior to placing the machine learning model 116 into production) using historical training data (e.g., archived data associated with launching computing instances 112 within the computing service 108). After training the machine learning model 116 using the historical training data, the machine learning model 116 may be placed online (e.g., in a production environment) where the machine learning model 116 may process requests for predicted launch times. In some examples, periodically, the machine learning model 116 may be taken offline and retrained using historical training data that has accumulated since the last time the machine learning model 116 was trained.

In another example configuration, the machine learning model 116 may be initially trained using historical training data and placed in production where the machine learning model 116 may process requests for predicted launch times. Subsequently, the machine learning model 116 may be retrained while in production using active training features (e.g., recent feature data associated with launching computing instances 112 within the computing service environment 108). For example, feature data accumulated over the past number of minutes, hours or days may be used to retrain or further refine the training of the machine learning model 116. A feature data set accumulated within a relatively short time span may be small enough that the machine learning model 116 may be retrained within a short time period (e.g., minutes) without having to take the machine learning model 116 out of production.

Figure 2:
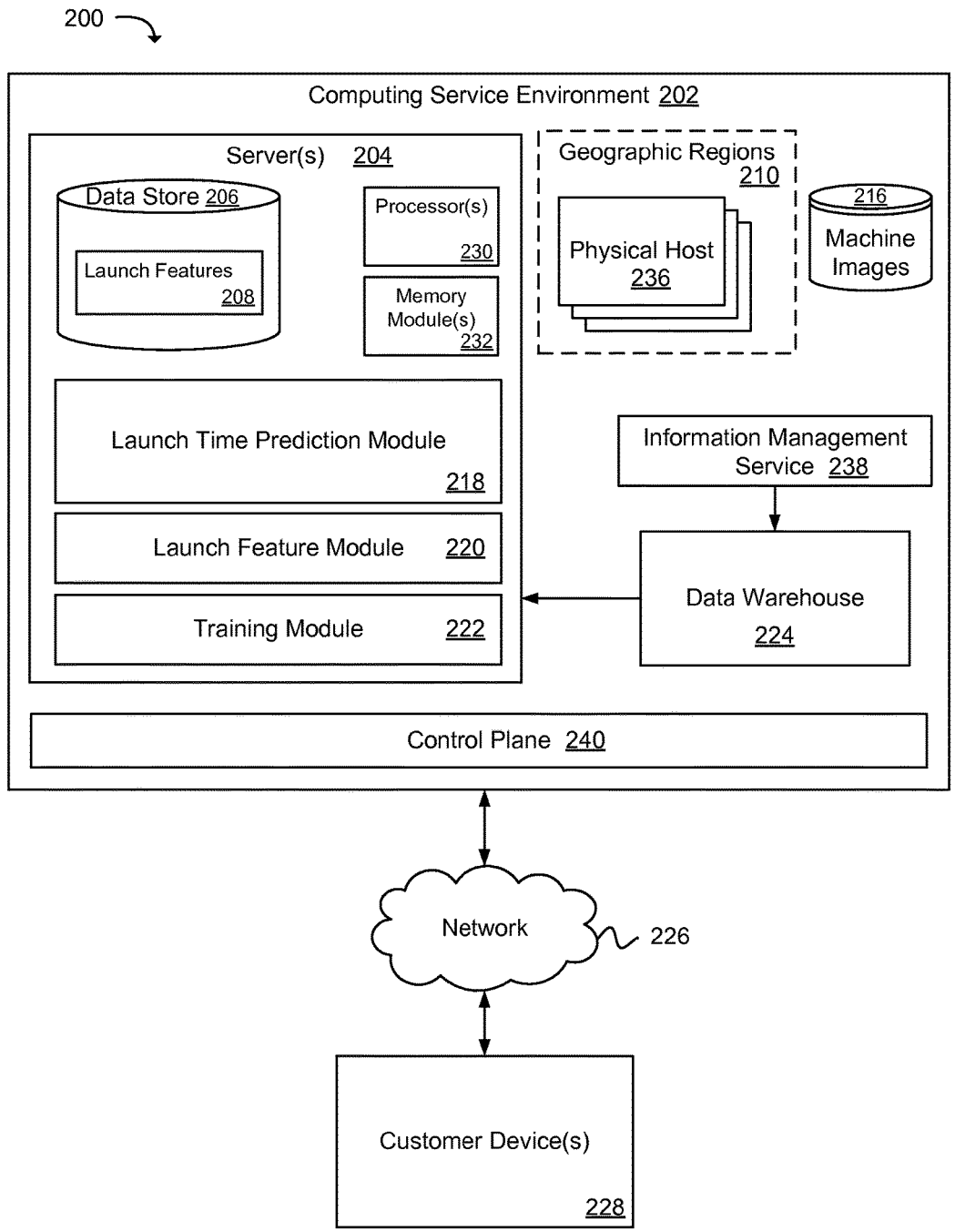
FIG. 2 is a block diagram that illustrates various example components included in a system for predicting a computing instance launch time.

FIG. 2 illustrates components of an example system 200 on which the present technology may be executed. The system 200 may include a computing service environment 202 that may be accessible to a number of customer devices 228 via a network 226. The computing service 202 may provide customers with network accessible services, such as computing instances that execute on physical hosts 236. Included in the computing service environment 202 may be a server 204 that hosts a launch time prediction module 218 that may be used to generate predicted launch times for computing instances launched on the physical hosts 236. In addition to the launch time prediction module 218, the server 204 may contain a training module 222, a launch feature module 220 and one or more data stores 206 having data that may be accessible to the modules contained on the server 204.

In one example configuration, the launch time prediction module 218 may be configured to generate predicted launch times using a machine learning model. The launch time prediction module 218 may provide predicted launch times for computing instances placed on physical hosts 236 located within a particular portion of the computing service environment 202. For example, as illustrated in FIG. 2, the launch time prediction module 218 may be executed within the computing service environment 202 and may provide predicted launch times for computing instances launched in the computing service environment 202. In another example configuration, the launch time prediction module 218 may be external to any computing services and may receive requests for predicted launch times from any number of computing services by way of a network.

Examples of machine learning models that may be used by the launch time prediction module 218 to predict a launch time may include regression models, such as a random forest model, extremely randomized trees model, an AdaBoost model, a stochastic gradient descent model, a support vector machine model, as well as other types of machine learning models not specifically mentioned here.

A training module 222 may be configured to obtain features from various data sources that are then used to train a machine learning model used by the launch time prediction module 218. In one example, feature and training data may be retrieved from a data warehouse 224. The feature data may be launch metrics from previous computing instance launches within the computing service 202 that have been stored to the data warehouse 224. Illustratively, an information management service 238 may push (e.g., upload) launch related data to the data warehouse 224 making the data accessible to the training module 222. Data retrieved from the data warehouse 224 may be recent data (e.g., seconds, minutes or hours old) or historical data (e.g., days, weeks or months old) associated with computing instance launches.

Feature data retrieved from the data warehouse 224 may align with launch features 208 determined to have an impact on a launch time of a computing instance. Illustratively, analysis may be performed to determine which launch features 208 impact a launch time and a query may then be constructed that selects feature data for the launch features 208 from the data warehouse 224. In some examples, feature data for the launch features 208 may be processed and summarized when the feature data may be large or redundant. For example, feature data may be processed into a reduced representation set of launch features (e.g., features vector). Having obtained the launch features 208, the machine learning model may then be trained using the launch features 208.

As described earlier, the machine learning model may be initially trained using historical data and then placed in production where the machine learning model may provide a predicted launch time according to an on demand basis. The training module 222 may be configured to obtain historical data for launch features 208 from a data warehouse 224 and provide the historical data to the machine learning model. The historical data may be used to initially train the machine learning model. Subsequent training of the machine learning model may be performed by taking the machine learning model out of production (e.g., offline) and training the machine learning model using historical data (e.g., data from the previous day, week, month, etc.). Alternatively, subsequent training may be performed while the machine learning model is in production (e.g., online) using recent data (e.g., data from the previous minutes, hours, day, etc.).

The launch feature module 220 may be configured to obtain launch features 208 associated with a request for a predicted launch time. The launch features 208 obtained may then be provided as input to the machine learning model. As an illustration, a request to launch a computing instance (e.g., via a customer device 228) may be received by a control plane 240 for a computing service 202. A launch request may be for a single computing instance or any number of computing instances (e.g., tens, hundreds or thousands of computing instances). Upon receiving the launch request, a launch configuration may be determined for the computing instance that specifies, among other things, machine image features, physical host features and customer configuration features (e.g., storage devices, network types, geographic region, etc.). The launch configuration (or a reference to the launch configuration) may then be included in a request for a predicted launch time.

Upon the server 204 receiving a request for a predicted launch time, the launch configuration may be provided to the launch feature module 220, whereupon the launch configuration may be evaluated and data for launch features 208 corresponding to the launch configuration may be collected. Based on the specifications of the launch configuration, data for launch features 208 may then be obtained.

Data collected for the launch features 208 may be provided to the launch time prediction module 218 and input to a machine learning model. The launch time prediction module 218 may then generate a predicted launch time via an algorithm that determines a predicted launch time by evaluating the launch features 208 provided to the launch time prediction module 218. As one example, a machine learning model used by the launch time prediction module 218 may comprise a number of decision trees where launch features 208 are input into the decision trees and using regression, a predicted launch time is calculated from the output of the decision trees. The predicted launch time generated by the machine learning model may then be used for various purposes associated with a computing service 202 as described earlier.

A physical host 236 included in the system 200 may be a server computer configured to execute an instance manager (i.e., a hypervisor, virtual machine monitor (VMM), or another type of program) that manages multiple computing instances on a single physical host 236. The physical hosts 236 may be located in data centers within various geographical regions 210. As a result, launch times for computing instances may be influenced based on the geographical region 210 of a physical host 236 selected to host a computing instance. Also, a launch time may be influenced by other attributes of a physical host 236, such as architecture, brand, etc.

A machine image 216 may be a pre-configured virtual machine image (e.g., a virtual appliance) that may be executed by an instance manager. A machine image 216 may include a machine executable package for a computing instance that may include an operating system, an application server and various applications, any of which may influence a launch time of a computing instance. Further the machine image 216 may include mappings to storage volumes that attach to a corresponding computing instance when the computing instance is launched.

Illustratively, machine images 216 may be stored in block level storage volumes or in a network file storage service. The storage location of a machine image 216 may influence a launch time of a computing instance. For example, when storing a machine image 216 in a network file storage service, the machine image 216 may be compressed in order to facilitate transferring of the machine image 216 over a network. As a result, after transferring the machine image 216 to a physical host 236 selected to host a computing instance, the further operation of decompressing the machine image 216 may increase a launch time of the computing instance.

The various processes and/or other functionality contained within the system 200 may be executed on one or more processors 230 that are in communication with one or more memory modules 232. The system 200 may include a number of computing devices (e.g., physical hosts 236 and servers 204) that are arranged, for example, in one or more server banks or computer banks or other arrangements.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

In some examples, a customer may utilize a customer device 228 to request a launch of a computing instance and thereafter access the computing instance. A customer device 228 may include any device capable of sending and receiving data over a network 226. A customer device 228 may comprise, for example a processor-based system such as a computing device.

The network 226 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
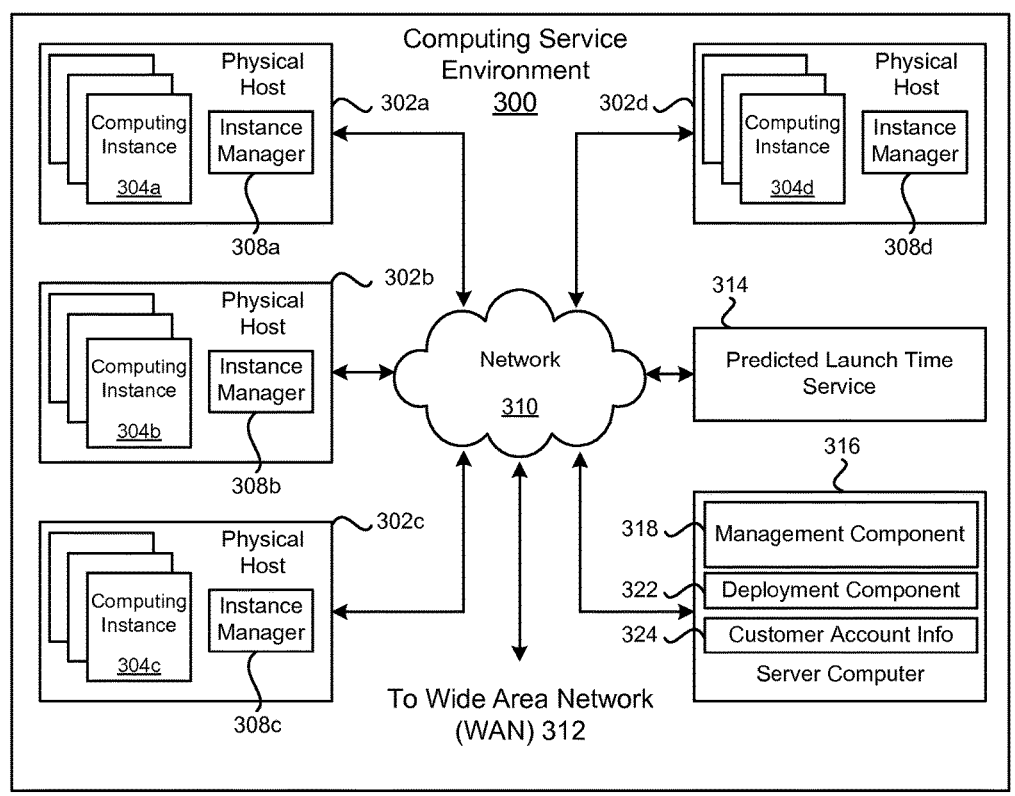
FIG. 3 is a block diagram that illustrates an example computing service environment that includes a predicted launch time service.

FIG. 3 is a block diagram illustrating an example computing service environment 300 that may be used to execute and manage a number of computing instances 304a-d. In particular, the computing service environment 300 depicted illustrates one environment in which the technology described herein may be used. The computing service environment 300 may be one type of environment that includes various virtualized service resources that may be used, for instance, to host computing instances 304a-d.

The computing service environment 300 may be capable of delivery of computing, storage and networking capacity as a software service to a community of end recipients. In one example, the computing service environment 300 may be established for an organization by or on behalf of the organization. That is, the computing service environment 300 may offer a "private cloud environment." In another example, the computing service environment 300 may support a multi-tenant environment, wherein a plurality of customers may operate independently (i.e., a public cloud environment). Generally speaking, the computing service environment 300 may provide the following models: Infrastructure as a Service ("IaaS"), Platform as a Service ("PaaS"), and/or Software as a Service ("SaaS"). Other models may be provided. For the IaaS model, the computing service environment 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service environment 300. End customers may access the computing service environment 300 using networked client devices, such as desktop computers, laptops, tablets, smartphones, etc. running web browsers or other lightweight client applications, for example. Those familiar with the art will recognize that the computing service environment 300 may be described as a "cloud" environment.

The particularly illustrated computing service environment 300 may include a plurality of physical hosts 302a-d. While four physical hosts are shown, any number may be used, and large data centers may include thousands of physical hosts 302a-d. The computing service environment 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the physical hosts 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single physical host. Additionally, each of the computing instances 304a-d may be configured to execute one or more applications.

One or more server computers 314 and 316 may be reserved to execute software components for managing the operation of the computing service environment 300 and the computing instances 304a-d. For example, a server computer 314 may execute a predicted launch time service that may respond to requests for a predicted launch time for a computing instance launched on a physical host 302a-d.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service environment 300, the physical hosts 302a-d and the server computers 316. The network 310 may be a local area network (LAN) and may be connected to a Wide Area Network (WAN) 312 or the Internet, so that end customers may access the computing service environment 300. The network topology illustrated in FIG. 3 has been simplified, many more networks and networking devices may be utilized to interconnect the various computing systems disclosed herein.

Figure 4:
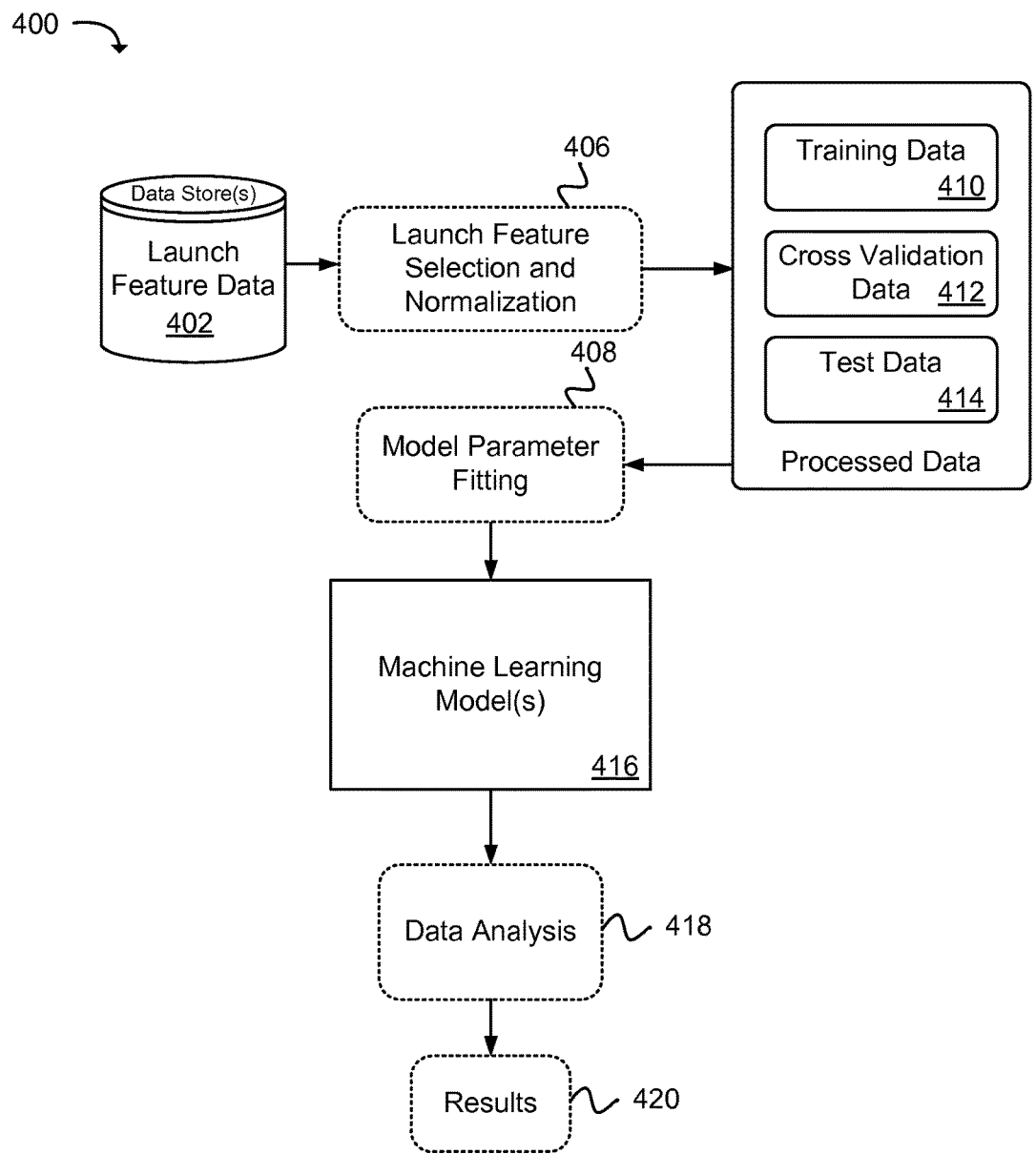
FIG. 4 is a diagram illustrating an example method for configuring and training a machine learning model used to generate a predicted launch time.

Moving now to FIG. 4, a diagram illustrates an example method 400 for configuring and training a machine learning model 416 used to generate a predicted launch time. As in block 406, launch feature selection may be performed by analyzing various computing instance launches to determine launch features that have an impact on a computing instance launch time. For example, various features of launching a computing instance on a physical host within a computing service environment, where the features are capable of being observed, may be identified.

Examples of launch features may include, but are not limited to: a number of contending computing instances on a physical host, a number of running computing instances on a physical host, a data store type containing a machine image used to create a computing instance, a kernel image used by a computing instance, an architecture of a physical host, a virtualization type of a computing instance, a maximum number of computing instances that a physical host is capable of hosting, a percentage of occupancy of a physical host by computing instances at a start of a computing instance launch, a geographical region where a physical host is located, a hardware type of a physical host, a hardware vendor of a physical host, and an operating system, networking type, data store and size of a computing instance.

Launch features determined to have an impact on a launch time of a computing instance may be categorized. For example, categories of launch features may be based on various aspects of a computing instance launch. As an illustration, launch features may be categorized into machine image launch features, physical host launch features and customer configuration launch features.

In one example, identified launch features may be sorted or ranked according to an impact of a launch feature on a computing instance launch time and those launch features having the greatest impact on launch time may be selected as features to be used for predicting launch times. For example, launch features may be analyzed to determine a percentage of contribution that an individual launch feature has on a launch time. Launch features identified as having the greatest contribution on a launch time may be selected as input to a machine learning model. It should be noted that any number of launch features may be selected and the selection of the launch features may not be limited to just those launch features having the greatest impact on a launch time.

Having identified the launch features, launch feature data 402 for the launch features may then be obtained from data sources containing data associated with the launch features. As illustrated, launch feature data 402 may be obtained from a data store containing, for example, computing service management data, inventory data (e.g., physical host information), as well as other data associated with a computing service. The launch feature data 402 may be normalized enabling launch feature data 402 obtained from different data sources to be input into the machine learning model 416. The launch feature data 402 may be divided into training data 410, cross validation data 412 and test data 414. For example, a percentage of the launch feature data 402 may be randomly selected as test data 414 and cross validation data 412, and the remaining launch feature data 402 may be used as training data 410 to train the machine learning model 416.

The machine learning model 416 may be selected from among any available machine learning algorithm. In one example, a number of regression machine learning models may be tested to determine a machine learning model that provides an acceptable approximation of a launch time. One aspect of generating machine learning models may be, as in block 408, performing a parameter value search for machine learning parameters that result in a goodness-of-fit of the machine learning model 416 to the launch features. Machine learning parameters (i.e., parameters used to configure a machine learning model 416, such as setting a depth of a decision tree) may affect how a machine learning model 416 fits the training data 410. In one example, grid search or a gradient descent algorithm may be used to perform a parameter value search. In another example, an evolutionary algorithm (e.g., a distributed genetic algorithm), a swarm algorithm (e.g., particle swarm optimization), simulated annealing or like algorithms may be used when a parameter space of a machine learning model 416 may be too large to perform a thorough parameter value search.

After selecting a machine learning model 416, the machine learning model 416 may be trained using the training data 410. The cross validation data 412 and the test data 414 may then be run through the machine learning model 416 to test whether the outputs of the machine learning model are representative for additional historical cases. Thereafter, as in block 418, data analysis may be performed to determine how well the machine learning model 416 was able to predict a launch time compared to an actual launch time. After testing two or more machine learning models 416, as in block 420, the results of the machine learning models 416 may be compared to identify the better performing machine learning model 416, which may then be selected and placed in a production environment.

Figure 5:
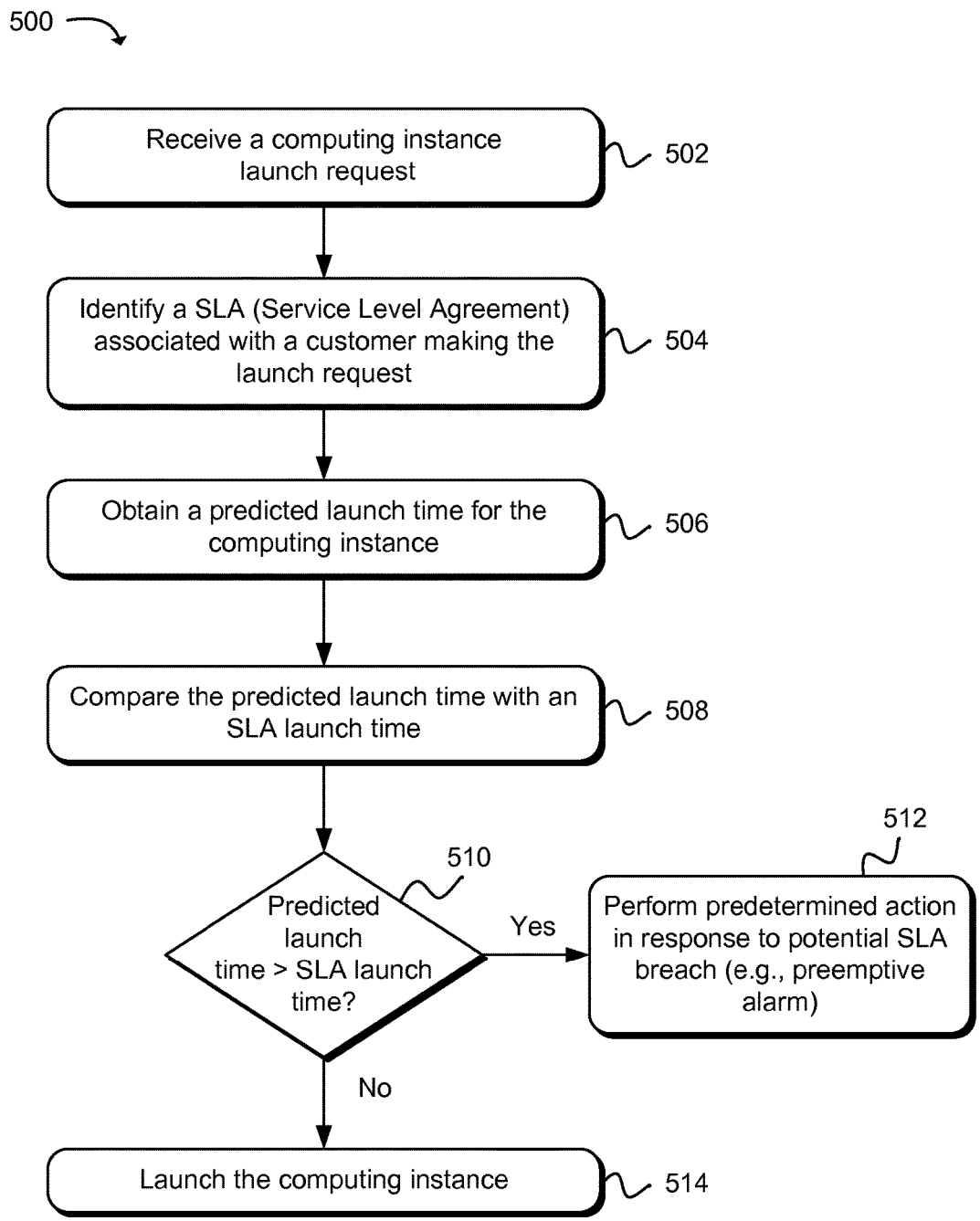
FIG. 5 is a flow diagram illustrating an example method for predicting a breach of an SLA (Service Level Agreement) launch time using a predicted launch time.

FIG. 5 is a flow diagram illustrating one example of a method 500 in which a predicted launch time may be used. The example method 500 illustrated is for predicting a likely breach of an SLA launch time using a predicted launch time. An SLA launch time may be, in one example, a launch time for a computing instance that a computing service provider has agreed to provide as part of service contract. As such, a computing service provider may wish to be notified that an SLA will likely be breached prior to an actual breach of the SLA launch time, allowing the computing service provider to act accordingly.

Beginning in block 502, a launch request may be received requesting that one or more computing instances be launched within a computing service. For example, the request may be made by a customer wishing to launch one computing instance or a group of computing instances within the computing service environment. Upon receiving the launch request, a launch service may identify a launch configuration for the one or more computing instances to be launched.

As in block 504, an SLA associated with the customer making the launch request may be identified. The SLA may, among other things, specify an SLA launch time for a computing instance. Illustratively, the SLA launch time may be a time between a computing service receiving a launch request to a time where the computing instance is running (e.g., starting the boot up process). Thus, a customer making a launch request may expect that a computing instance will be ready within the SLA launch time.

After receiving the launch request and identifying the launch configuration and SLA launch time, as in block 506, a predicted launch time for the computing instance may be obtained. For example, a request may be made to a predicted launch time service that generates a predicted launch time as described earlier. As an illustration, the request for the predicted launch time may include a launch configuration or a reference to a launch configuration for one or more computing instances. The predicted launch time service may then generate a predicted launch time for the one or more computing instances by identifying launch features based at least in part on the launch configuration and inputting the launch features into a machine learning model that outputs a predicted launch time.

As in block 508, the predicted launch time may then be compared with the SLA time to determine whether, as in block 510, the predicted launch time is greater than the SLA launch time. The comparison of the predicted launch time and the SLA launch time may provide an indication of whether the SLA launch time is likely be achieved or breached.

In a case where the predicted launch time is not greater than the SLA launch time, as in block 514, the one or more computing instances may be launched. In a case where the predicted launch time is greater than the SLA time, as in block 512, a predetermined action may be performed in response to a potential SLA launch time breach. One example of a predetermined action may include notifying a computing service operator and/or a customer that the SLA launch time is likely not going to be achieved. As such, the computing service operator and/or the customer may attempt to mitigate or prevent the likely SLA launch time breach by performing actions that may increase the launch time. For example, a computing service provider may remove a physical host that is causing increased launch times from a group of physical hosts providing computing capacity. Alternatively, or in addition, a customer may be advised to modify those aspects of a launch configuration for a computing instance that may be within the customer's control, as well as other actions that a computing service operator and/or a customer may perform that are not specifically described here.

In one example configuration, upon a determination that an SLA launch time will likely be breached, a computing process may analyze the state of a computing service environment in which the computing instance is to be launched to determine whether an action preventing a breach of the SLA launch time can be performed. As one example of an action that may be performed, available computing capacity may be analyzed to determine whether adding additional physical hosts that increase computing capacity may increase launch times. For instance, a group of physical hosts may provide available computing capacity to host a plurality of computing instances. The group of physical hosts may be analyzed to determine how many computing instances the group of physical hosts may be capable of hosting and to determine how many computing instances the group of physical hosts is currently hosting (e.g., running computing instances). Based on the results of the analysis, additional physical hosts may be added to the group of physical hosts to increase available computing capacity.

As another example of an action that may be performed in response to a likely SLA launch time breach, individual physical hosts included in a group of physical hosts providing computing capacity may be analyzed to determine whether a physical host may be negatively affecting launch times. As a specific example, an overloaded physical host included in a group of physical hosts may affect launch times due to a number of computing instances being launched simultaneously on the overloaded physical host. For example, the overloaded physical host may appear to have available computing capacity to host a computing instance, but due to the number of computing instance launches that the overloaded physical host is processing, a launch time for a computing instance on the overloaded physical host may exceed an SLA launch time. As such, the overloaded physical host may be removed from the group of physical hosts that are considered available to host a computing instance. Specifically, prior to generating a second predicted launch time for a computing instance (e.g., because the first predicted launch time included the overloaded physical host), the overloaded physical host may be removed from the available computing capacity. The second predicted launch time may then be generated, which may result in prediction of a faster launch time as compared to the first predicted launch time based on available computing capacity that included the overloaded physical host.

As yet another example of an action that may be performed in response to a likely SLA launch time breach, a launch configuration for a computing instance may be analyzed to determine whether changes to the launch configuration may result in an increased launch time. As an illustration, a launch configuration may specify parameters and computing resources that are used to launch a computing instance. These parameters and computing resources may affect a predicted launch time for the computing instance. As such, the launch configuration may be analyzed to determine whether changes to the launch configuration may result in a predicted launch time that does not breach the SLA launch time. As a specific example, a launch configuration may specify a geographic region in which to launch a computing instance. Analysis may be performed to determine whether launching the computing instance in a different geographic region would result in a better predicted launch time. In a case where analysis determines that a different geographic region may result in a better predicted launch time, the launch configuration may be modified to include the different geographic region.

Alternatively, or in addition to the operations described above, a feature (e.g., an SLA breach feature) representing the SLA launch time breach may be provided as input to a machine learning classification model that outputs a classification indicating whether a computing instance launch may breach an SLA launch time. For example, the SLA breach feature may be considered along with other features provided to the machine learning classification model. Using an algorithm (e.g., a classifier), input feature data provided to the machine learning model may be mapped to a category. Thus, in an example where a predicted launch time feature may be greater than an SLA launch time feature, the machine learning classification model may output a classification indicating that the launch time for a computing instance will likely breach the SLA launch time.

Figure 6:
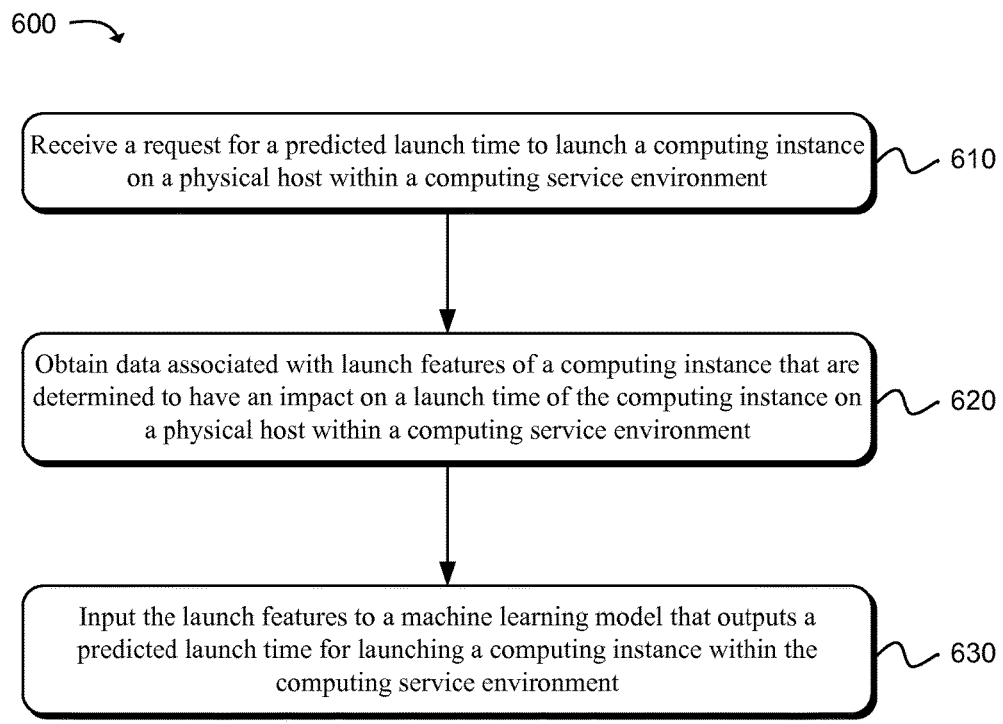
FIG. 6 is a flow diagram that illustrates an example method for predicting a launch time for a computing instance.

FIG. 6 is a flow diagram illustrating an example method 600 for predicting a launch time for a computing instance. Beginning in block 610, a request may be received for a predicted launch time associated with launching a computing instance on a physical host within a computing service environment. The predicted launch time may be a time in which a computing instance is in a pending state (i.e., executing service calls to setup computing instance resources, identifying a physical host to host the computing instance and creating the computing instance on the physical host) to a time in which the computing instance is in an executing state (i.e., the start of booting the computing instance). In some examples, a time in which a customer receives a usable computing instance (e.g., a booted computing instance) may be included in a predicted launch time by including a boot time for the computing instance, which may be affected by an internal configuration of the computing instance.

As in block 620, data may be obtained that is associated with launch features of a computing instance determined to have an impact on a launch time of the computing instance on a physical host within a computing service environment. For example, launch features that may be determined to have an impact on launch time may include, but are not limited to: machine image launch features (e.g., features for a machine image used to create the computing instance), physical host launch features (e.g., features of a physical host selected to host the computing instance) and launch configuration features that may be controlled by a customer (e.g., machine image configuration, geographic region, number of computing instances launched simultaneously, etc.). In one example, after obtaining the data associated with the launch features, the data may then be normalized.

As in block 630, the launch features (i.e., the data for the launch features) may be input to a machine learning model that outputs a predicted launch time for launching the computing instance on a selected physical host within the computing service environment. In one example, the machine learning model may be a regression model (e.g., a random forest regression model).

The machine learning model may be trained using historical data and then placed in a production environment where the machine learning model receives active requests for predicted launch times. In one example configuration, the machine learning model may be periodically trained using historical data (e.g., prior day, week or month launch features). In another example configuration, the machine learning model may be trained by extracting launch features from active data (e.g., prior seconds, minutes, hours) and retraining the machine learning model while the machine learning model is in a production environment, thereby enabling the machine learning model to be adaptive to changes occurring within the computing service.

The predicted launch time generated by the machine learning model may then be provided in response to the request. As one example, the predicted launch time may be provided to various services within the computing service, such as a computing instance placement service that selects a physical host for a computing instance. As another example, the predicted launch time may be provided to a customer, thereby informing the customer of the predicted launch time, or advising the customer of whether an SLA launch time is likely to be achieved. As yet another example, the predicted launch time may be provided to a computing service operator allowing the computing service operator to analyze and modify a computing service environment according to the predicted launch time. As will be appreciated, a predicted launch time may be utilized for any purpose and is not therefore limited to the examples disclosed herein.

Figure 7:
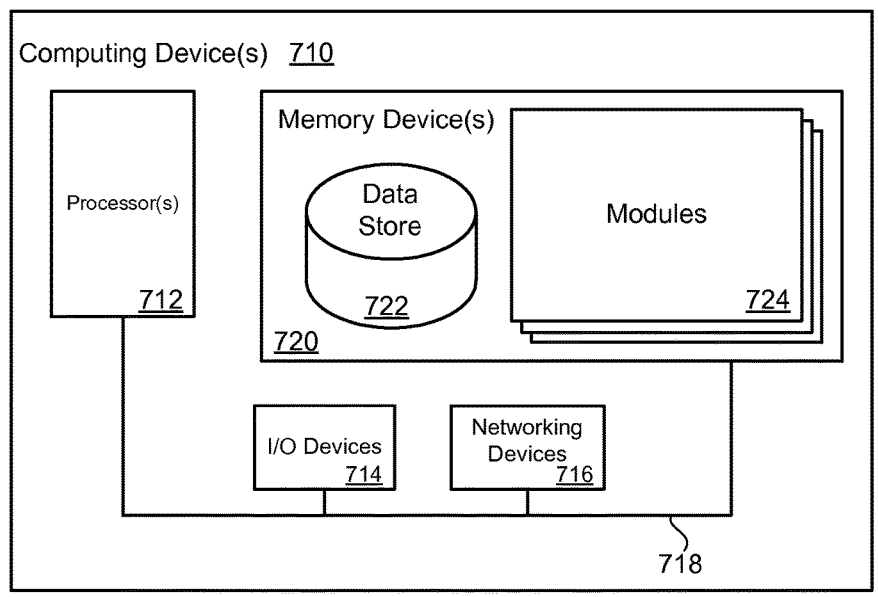
FIG. 7 is block diagram illustrating an example of a computing device that may be used to execute a method for predicting a launch time for a computing instance.

FIG. 7 illustrates a computing device 710 on which modules of this technology may execute. A computing device 710 is illustrated on which a high level example of the technology may be executed. The computing device 710 may include one or more processors 712 that are in communication with a plurality of memory devices 720. The computing device 710 may include a local communication interface 718 for the components in the computing device. For example, the local communication interface 718 may be a local data bus and/or any related address or control busses as may be desired.

A memory device 720 may contain modules 724 that are executable by the processor(s) 712 and data for the modules 724. For example, a memory device 720 may contain a training module and a launch feature module. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   obtain training data representing launch features for a plurality of previous computing instance launches, wherein the launch features are selected for having an impact on amounts of time taken for the plurality of previous computing instance launches;
   train a random forest regression model using the training data, wherein the random forest regression model is trained to output predicted launch times for launching a computing instance;
   receive a request for a predicted launch time to launch the computing instance on a physical host within a computing service environment, wherein the request references a launch configuration specifying parameters for launching the computing instance;
   evaluate the parameters of the launch configuration to identify the launch features associated with launching the computing instance determined to have an impact on the launch time of the computing instance;
   input the launch features associated with launching the computing instance into the random forest regression model which outputs the predicted launch time for launching the computing instance within the computing service environment;
   determine that an SLA (Service Level Agreement) launch time is likely to be met by comparing the predicted launch time with the SLA launch time; and
   initiate a launch of the computing instance using the launch configuration.

2. A non-transitory machine readable storage medium as in claim 1, wherein instructions that when executed by the processor further select the launch features determined to have an impact on the launch time of the computing instance from launch features including: machine image launch features, physical host launch features or customer configuration launch features.

3. A computer implemented method, comprising: under control of one or more computer systems configured with executable instructions,
   obtaining training data representing launch features for a plurality of previous computing instance launches;
   training a machine learning model using the training data to output predicted launch times for launching a computing instance;
   receiving a request for a predicted launch time to launch the computing instance on a physical host within the computing service environment, wherein the request references a launch configuration specifying parameters for launching the computing instance;
   evaluating the parameters of the launch configuration to identify the launch features associated with launching the computing instance determined to have an impact on the launch time of the computing instance;
   obtaining data associated with the launch features of the computing instance;
   inputting the data associated with the launch features of the computing instance to a machine learning model which outputs the predicted launch time for launching the computing instance within the computing service environment;
   providing the predicted launch time for the launch configuration; and
   initiating a launch of the computing instance using the launch configuration.

4. A method as in claim 3, wherein obtaining the data associated with launch features further comprises obtaining data associated with machine image launch features, physical host launch features and customer configuration launch features.

5. A method as in claim 3, further comprising normalizing the launch features prior to inputting the launch features to the machine learning model.

6. A method as in claim 3, further comprising performing a parameter value search for machine learning parameters that result in a goodness-of-fit of the machine learning model to the launch features.

7. A method as in claim 6, wherein performing the parameter value search further comprises, performing a parameter value search for machine learning parameters using a distributed genetic algorithm.

8. A method as in claim 3, wherein obtaining data associated with launch features further comprises:
   obtaining active training data representing launch features for a plurality of previous computing instance launches;
   extracting features from the active training data associated with the launch features; and
   training the machine learning model using the features from the active training data.

9. A method as in claim 3, wherein inputting the launch features to a machine learning model further comprises inputting the launch features to a machine learning model selected from at least one of: a random forest model, an extremely randomized trees model, an AdaBoost model, a stochastic gradient descent model or a support vector machine model.

10. A method as in claim 3, wherein inputting the launch features to a machine learning model further comprises, inputting the launch features of the computing instance to a machine learning regression model.

11. A method as in claim 3, further comprising, receiving a launch request from a customer to launch the computing instance;
   identifying an SLA launch time associated with a computing instance type for the computing instance; and
   determining whether the SLA launch time is likely to be met by comparing the predicted launch time for the computing instance with the SLA launch time.

12. A method as in claim 11, further comprising notifying a computing service provider that the SLA launch time is likely not going to be achieved when a determination is made that the predicted launch time is greater than the SLA launch time.

13. A method as in claim 11, further comprising constructing an SLA breach feature for the predicted launch time being greater than the SLA launch time and including the SLA breach feature with other features inputted to a machine learning classification model.

14. A method as in claim 3, further comprising:
identifying an SLA launch time for the computing instance;
determining whether the SLA launch time is likely to be met by comparing the predicted launch time for the computing instance with the SLA launch time; and
analyzing a state of a computing service environment in which the computing instance is to be launched to determine whether an action may be performed that is likely to prevent a breach of the SLA launch time when a determination has been made that the SLA launch time will likely be breached.

15. A method as in claim 14, wherein an action performed further comprises, removing a physical host from a group of physical hosts available to host the computing instance.

16. A method as in claim 14, wherein an action performed further comprises, adding at least one physical host to a group of physical hosts available to host the computing instance.

17. A system comprising:
a processor;
a memory device including instructions that, when executed by the processor, cause the system to:
obtain training data representing launch features for a plurality of previous launches of a computing instance in a computing service environment;
train a machine learning model using the training data to output predicted launch times for launching the computing instance;
receive a request for a predicted launch time to launch the computing instance on a physical host within the computing service environment, wherein the request references a launch configuration specifying parameters for launching the computing instance;
identify the launch features contained in the launch configuration, the launch features determined to have an impact on a launch time of the computing instance within the computing service environment;
obtain data for the launch features from a data source;
input the data for the launch features to the machine learning model which outputs a predicted launch time for launching the computing instance within the computing service environment;
determine that an SLA launch time is likely to be met by comparing the predicted launch time with the SLA launch time; and
initiate a launch of the computing instance using the launch configuration.

18. A system as in claim 17, wherein the memory device includes instructions that, when executed by the processor, cause the system to input the launch features to a machine learning regression model.

19. A system as in claim 17, wherein the memory device includes instructions that, when executed by the processor, cause the system to obtain: features of a machine image used to launch the computing instance, features of physical host servers capable of hosting the computing instance and features of computing instance attachments that are to be attached to the computing instance when launched.

* * * * *